May 24, 1949.　　　H. F. MERRIAM　　　2,471,072
MANUFACTURE OF SULFURIC ACID
Filed April 3, 1946
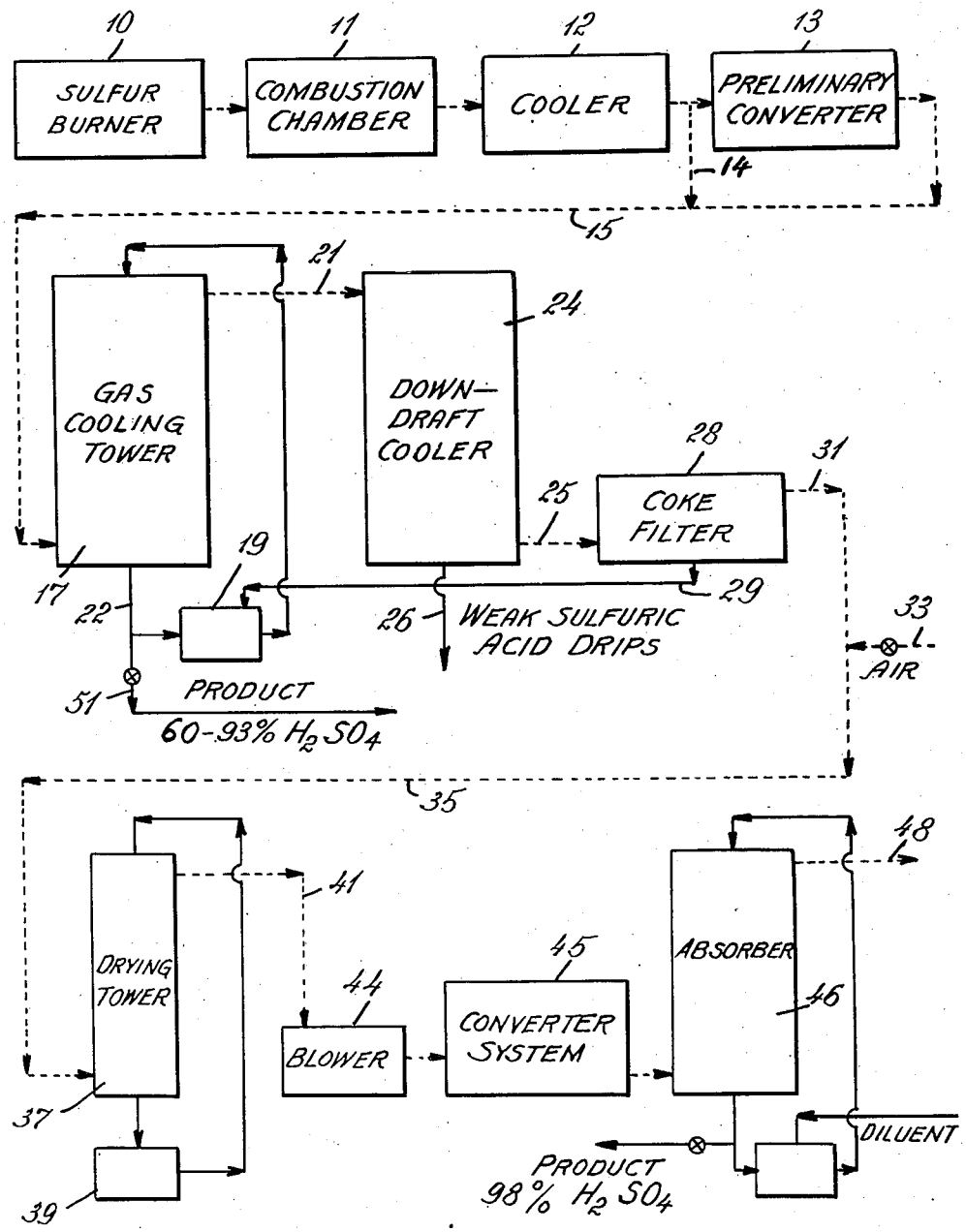
INVENTOR
H. F. MERRIAM
BY
ATTORNEY Patented May 24, 1949

2,471,072

UNITED STATES PATENT OFFICE 2,471,072

MANUFACTURE OF SULFURIC ACID

Henry F. Merriam, West Orange, N. J., assignor to Allied Chemical & Dye Corporation, a corporation of New York Application April 3, 1946, Serial No. 659,410

3 Claims. (Cl. 23—167)

This invention relates to the manufacture of sulfuric acid by the contact process.

In the usual commercial process for making sulfuric acid by the contact process, $SO_2$ is catalytically oxidized to $SO_3$, and the resulting $SO_3$ is absorbed in strong sulfuric acid to form the desired product. This process includes a single $SO_2$ oxidation system and a single $SO_3$ absorption or recovery system, and for convenience of discussion herein may be designated as a "single phase $SO_2$ oxidation-$SO_3$ recovery system."

It has been proposed to make sulfuric acid by subjecting a suitable $SO_2$-oxygen gas mixture to the action of an $SO_2$ oxidation catalyst under conditions to oxidize part but not all of the $SO_2$ to $SO_3$, separating the $SO_3$ from the gas stream by absorption in strong sulfuric acid, passing the gas stream containing oxygen and residual $SO_2$ through a second catalytic oxidation stage in which the remaining $SO_2$ is oxidized to $SO_3$, and then recovering the $SO_3$ thus formed in a second strong sulfuric acid absorber. For convenience of discussion herein, such an operation—including as a first phase, a first converter and a first absorber, and as a second phase, a second converter and a second absorber—may be designated generally as a "multiple phase $SO_2$ oxidation-$SO_3$ recovery system." While this type of process has been considered theoretically sound for many years, such operations have never become of commercial importance. In prior multiple $SO_2$ oxidation-$SO_3$ recovery systems, it has been proposed to catalytically oxidize a major portion, e. g. 60–80%, of the dry $SO_2$ to $SO_3$ in the first conversion stage, and then take the $SO_3$ resulting from first conversion out of the gas stream by means of the commonly known $SO_3$ absorption, using for the latter purpose strong sulfuric acid of the order of 98% strength. The attempts to utilize in the first phase of the operation, the combination of (1) catalytic oxidation of a major portion of the dry $SO_2$ to $SO_3$, (2) the known principles for absorption of $SO_3$ out of a dry gas stream, and (3) strong sulfuric acid for $SO_3$ absorption have resulted in the formation, in the gaseous effluent of the first absorber stage, of a peculiar sulfuric acid mist condition. This mist has been of such a refractory nature that it has not been possible to get rid satisfactorily of such mist by the usual methods of filtration, e. g. by the use of coke filters, etc., with the result that this refractory mist persists and causes corrosion of blowers, flues and heat exchangers.

paratory to utilizing such gases in the manufacture of sulfuric acid by the contact process are well known, e. g. Herreshoff U. S. Patents 940,595 of November 16, 1909, and 1,113,437 of October 13, 1914. A wet purification system includes at least one tower in which the hot incoming $SO_2$ gas is contacted countercurrent with a stream of sulfuric acid, normal operation of this tower being such that the $SO_2$-oxygen gaseous effluent contains sulfuric acid mist and water vapor. The predominating characteristics of this type of gas mixture are a high water vapor content most of which moisture may be condensed and discharged from the system as economically disposable weak sulfuric acid, and the presence of an acid mist of a type which not only may be readily separated from the gas stream but also may be recovered in usable form.

In accordance with the present invention, it has been found that the difficulties which have made it impracticable to use the above described multiple $SO_2$ oxidation-$SO_3$ recovery system in commercial operations may be overcome (a) by subjecting the initial $SO_2$-oxygen gas mixture to the action of an $SO_2$ oxidation catalyst under conditions to oxidize a substantial but preferably minor amount of the $SO_2$ to $SO_3$, (b) by treating the resulting partially converted $SO_2$ gas stream in accordance with the principles of wet purification as distinguished from the principles of $SO_3$ absorption, and (c) by using in such treating step sulfuric acid contacting medium of $H_2SO_4$ strength substantially less than usually employed in $SO_3$ absorption. By so doing, I have found that instead of getting a difficultly manageable acid mist at the end of the first phase of operation, as is the case with the use in the first phase of the process of the known $SO_3$ absorption, I am enabled to obtain in the first phase of operation an acid mist so amenable to handling that it may be readily removed from the gas stream by usual methods of filtration with the result that there is no refractory acid mist to pass into the second phase of operation.

The objects and advantages of the invention may be further understood from the following description taken in connection with the accompanying drawing showing diagrammatically apparatus in which the improved process may be carried out.

Referring to the drawing, any suitable sulfur bearing material, such as brimstone, may be burned in burner 10 along with air into combustion chamber 11. These two units may be operated as known in the art to form combustion chamber exit heated to temperature of 1400 to 1900° F. and containing by volume (dry basis) 8 to 12% $SO_2$, 5 to 10% oxygen, and varying quantities of water vapor. Such a gas stream is run thru a suitable cooler or radiator 12 functioning to cool the gas stream down to say 750–1100° F., but not lower than a temperature high enough to initiate catalytic oxidation of $SO_2$.

In accordance with one feature of the present improvements, the gas mixture is then subjected to the action of an $SO_2$ oxidation catalyst under conditions to oxidize a substantial but preferably minor amount of $SO_2$ to $SO_3$. The present process is particularly applicable to the handling of strong $SO_2$ gases, and while the gas stream entering the preliminary converter 13 may carry a deficiency of oxygen for commercial oxidation of total $SO_2$ to $SO_3$, such gas stream usually inherently contains more than sufficient oxygen to effect the $SO_2$ oxidation sought for in converter 13. The latter may be of any suitable design and contain any satisfactory catalyst such as vanadium or even $Fe_2O_3$. Size of the catalyst particles, depth of the catalyst layer or layers and other factors known in this art may be so chosen that for any given set of operating conditions the catalyst body affords no marked resistance to gas flow, and at the same time effects oxidation of preferably less than 50% of the $SO_2$ to $SO_3$. Under the better conditions of operation, oxidation of $SO_2$ to $SO_3$ in converter 13 may be upwards of 25% but not more than 40%. In this situation the amount of $SO_2$ oxidation effected in converter 13 usually is such as to leave in the gas stream enough $SO_2$ so that the catalysis step of the second phase of the process under discussion may be operated on a self-sustaining basis, i. e. no extraneous heat is needed to initiate or maintain catalysis. Should conditions be such that it is desired to effect a high degree of $SO_2$ oxidation in converter 13, enough strong $SO_2$ gas may be bypassed thru line 14 to put the second phase catalysis on a self-sustaining basis.

In accordance with a second feature of the invention, the gas mixture exiting converter 13, e. g. heated to temperatures of 1000 to 1300° F. and containing 6.5 to 9% $SO_2$, 2 to 5% $SO_3$, oxygen, nitrogen and moisture, is contacted with sulfuric acid of $H_2SO_4$ strength not in excess of 93% under conditions to concentrate such acid and to cool the gas stream to temperature of not more than 330° F. by conversion of all or part of the sensible heat of gas to latent heat of vaporization of water thereby forming a contacting zone off-gas containing $SO_2$, acid mist, and a substantial amount of water vapor. This result is accomplished by introducing the gas stream from line 15 into the bottom of a gas cooling or sulfuric acid condensing tower 17.

Such tower, which may be packed as desired, is provided with a circulating system designated as 19 by means of which the $H_2SO_4$ strength and temperature of the acid fed into the top of the tower may be controlled and by which the rate of circulation of such acid over the tower may be regulated. The countercurrent contacting operation carried out in tower 17 is characterized principally (1) by an approximate 0.5–1.5% increase of the $H_2SO_4$ concentration of the sulfuric acid liquor during one pass of acid over the tower, (2) by cooling of the gas stream to not more than 330° F., preferably in the range of 200–300° F., such cooling, aside from minor radiation loss, being effected substantially by conversion of sensible heat of the gas stream to latent heat of vaporization of water, and (3) by the introduction into the gas stream of a relatively large amount of water vapor. In accordance with another feature of the invention, it has been found that circulating system 19 should be operated so that the acid effluent of the cooling tower in line 22 has an $H_2SO_4$ strength not in excess of about 93%, i. e. so that the gas passing upwardly thru the tower contacts a downflow of acid of not more than 93% strength. Such acid strength may vary from 60 to not more than 93%, but is preferably of strength varying from 60 to not more than 80%. Temperature of the acid effluent in line 22 may vary from 160° F. to 450° F. depending chiefly on the strength of the acid product being made by tower 17. Thus, for a given gas flow into the bottom of tower 17, temperature, strength and quantity of the acid fed into the top of the tower are controlled so that the acid effluent leaving the bottom of the tower is at least slightly more concentrated than the acid input, is within the temperature range of about 160° to 450° F., and so that the temperature of the gas stream leaving the top of the tower is preferably not more than 300° F. and usually in the range of 200–300° F. It has been found that under the foregoing conditions some of the $SO_3$ entering the bottom of tower 17 unites with water and is condensed to $H_2SO_4$, that the gas stream leaving the top of tower 17 contains as $H_2SO_4$ mist the balance of the $SO_3$ entering the bottom of tower 17, and that this mist is readily amenable to separation from the gas stream. Further, such gas stream contains a substantial excess of water vapor over that needed to combine with all $SO_3$ present therein to form $H_2SO_4$.

Next, the gas stream containing sulfuric acid mist and excess moisture is cooled to temperature low enough to condense water vapor and facilitate removal of the acid mist. For this purpose, the gas stream may be run from line 21 into the top of a cooler 24 over the outer surface of which cold water may be flowed. Control of this cooler is such as to cool the gas stream to such an extent that the gaseous effluent leaving thru line 25 is at temperature of about 75°–110° F. Under these conditions most of the water condenses out and is discharged from the cooler thru line 26 as a liquor containing say 4–6% $H_2SO_4$, i. e. weak enough to permit economic disposal to waste if necessary. The gas stream containing residual $SO_2$, acid mist, some oxygen and a minor amount of moisture is run into the filter 28 which may contain a bed of coke of such varying area and depth as to effect precipitation and filtration of all of the acid mist contained in the gas stream. This acid mist runs out of the bottom of the filter thru line 29 as aqueous sulfuric acid of strength which may range from 10 to 30% $H_2SO_4$. Such liquor is run thru line 29 into circulating system 19 to return thereto the $H_2SO_4$ collected by filter 28, which $H_2SO_4$ is eventually recovered as product sulfuric acid at liquor off-take 51 of tower 17. Thus it will be seen that in the first phase of the process of this invention, i. e. the procedure up to the gas outlet of filter 28, the $SO_3$ formed in converter 13 is recovered as product sulfuric acid in a gas-liquid sulfuric acid contacting operation the off-gas stream (in conduit 21) of which contains $SO_2$, sulfuric acid mist, and a substantial amount of water vapor. This mist is of a type which is readily removed from the gas stream by simple coke filtration, with the result that no refractory or persistent mist is contained in the $SO_2$ gas stream as the latter enters the second phase of the process. While the chemical and/or physical phenomena involved are not fully known, it is believed that the presence of a substantial amount of water vapor in the off-gas of tower 17 is the factor to which readily separable nature of the contained acid mist may be attributed. It appears that, possibly because of absorption of water, the acid mist particles become increased to a size which permits thorough removal by simple filtration means.

The gaseous substantially mist free effluent of the filter in line 31 contains $SO_2$, oxygen, nitrogen and a small amount of moisture. Ordinarily, especially when utilizing in the first instance strong $SO_2$ gas, the gas in line 31 is deficient in oxygen to support catalytic oxidation of residual $SO_2$ to $SO_3$. In this situation whatever additional air may be necessary to supply the needed oxygen may be introduced at inlet 33. Such gas stream is then run thru line 35 and into the bottom of drying tower 37 provided with a drying acid circulating system 39. After drying, a typical gas stream in line 41 may contain 6.5 to 10% $SO_2$, and 6.5 to 10% oxygen, the balance being nitrogen, possibly some $CO_2$, etc. By means of blower 44 the gas stream is passed into and thru the converter system 45 and the resultant $SO_3$ is recovered as product sulfuric acid by absorber 46, operation of the process from drying tower 37 thru to the recovery of 98% $H_2SO_4$ from absorber 46 being substantially the same as in known practice. Converter system 45 may contain one or more converters and heat exchangers, e. g. as shown in Fowler U. S. Patent 1,930,125 of October 10, 1933. The tail gas leaving absorber 46 thru exit 48 may contain a small amount of acid mist unavoidably formed in the absorption step.

The process of the invention is particularly adaptable for handling wet, strong $SO_2$ gas. Since any excess water over and above that needed may be eliminated from the process thru downdraft cooler outlet 26, it will be seen that, provided a water insensitive catalyst is used in preliminary converter 13, no drying of the gas stream up to and including the coke filter 28 is necessary. In addition to the brimstone gas described, strong $SO_2$ gas obtained by combustion of $H_2S$ may be employed. Also, strong $SO_2$ gas resulting from the thermal decomposition of acid sludge may be introduced into combustion chamber 11 in which temperatures may be raised high enough to oxidize organic impurities to carbon dioxide, and the resulting gas passed thru the process as described.

In practice of the process of the invention, it is desirable to use an initial $SO_2$ gas containing not less than 10% $SO_2$ by volume, and preferably a gas containing 12% or more $SO_2$. The initial gas stream may be high in $SO_2$, e. g. 12-14%, and substantially deficient in oxygen for catalytic oxidation of the total $SO_2$ to $SO_3$. By means of the partial conversion step described it is possible to take part of the acid product out of the gas stream in the first phase of the process without the use of the substantially larger apparatus which would be necessary if it were required to carry in the gas stream in the forepart of the process all the oxygen needed for $SO_2$ oxidation. In the latter phase of the process, i. e. from the outlet of coke filter 28 on, $SO_2$ strength is usually appreciably less than 10%, and accordingly the apparatus in the last part of the process need not be designed to handle a strong $SO_2$ gas. Many existing contact sulfuric acid plants are designed to handle $SO_2$ gases not stronger than about 10%. By employing the partial conversion stage 13 of the instant process, an initial $SO_2$ gas containing 12% $SO_2$ and 9% $O_2$ would contain at the head of converter system 45 about 7.2% $SO_2$ and 8.1% $O_2$, and hence no appreciable change in design of the plant is necessary. In the case of a plant designed to handle an $SO_2$ gas of 10% maximum strength, it will be seen that by starting with a 12% $SO_2$ gas overall plant production may be increased 20%.

Sulfuric acid may be recovered in several marketable strengths—the 98% $H_2SO_4$ recovered from absorber 46, and as the product which may be recovered as "make" from circulating system 19 of cooling tower 17. In accordance with particularly desired operating conditions, the draw-off from circulating system 19 at 51 may be of strength from 40 to 93%, it being particularly feasible to operate tower 17 so that the products thereof may be 60° Bé. acid, 77.7% $H_2SO_4$ strength, or 66% Bé. acid, 93.2% $H_2SO_4$ strength.

I claim:

1. In the manufacture of sulfuric acid by the contact process, the steps comprising forming an $SO_2$-oxygen gas mixture heated to temperature high enough to initiate catalytic oxidation, subjecting the gas mixture to the action of an $SO_2$ oxidation catalyst under conditions to catalytically oxidize a substantial but minor amount of said $SO_2$ to $SO_3$, contacting the resulting gas stream in a gas-liquid contacting zone with sulfuric acid of $H_2SO_4$ strength not in excess of 93%, and in said zone, substantially by conversion of sensible heat of the gas to latent heat of vaporization of water, boiling water out of said acid and into the gas stream as water vapor, concentrating said acid, and cooling the gas stream to temperature not more than 300° F., whereby there is formed a contacting zone exit gas stream containing $SO_2$, acid mist and water vapor, cooling the gas stream containing acid mist and moisture to temperature low enough to condense the bulk of the water vapor as weak sulfuric acid and to facilitate removal of acid mist from the gas stream, separating acid mist from the gas stream, drying the gas stream, subjecting residual $SO_2$ to the action of an $SO_2$ oxidation catalyst, and recovering resulting $SO_3$ as sulfuric acid.

2. In the manufacture of sulfuric acid by the contact process, the steps comprising forming an $SO_2$-oxygen gas mixture heated to temperature high enough to initiate catalytic oxidation, subjecting the gas mixture to the action of an $SO_2$ oxidation catalyst under conditions to catalytically oxidize a substantial but minor amount of said $SO_2$ to $SO_3$, contacting the resulting gas stream in a gas-liquid contacting zone with sulfuric acid of $H_2SO_4$ strength not in excess of 93%, and in said zone, substantially by conversion of sensible heat of the gas to latent heat of vaporization of water, boiling water out of said acid and into the gas stream as water vapor, concentrating said acid, and cooling the gas stream to temperature not more than 330° F., whereby there is formed a contacting zone exit gas stream containing $SO_2$, acid mist and water vapor, and a contacting zone liquid effluent comprising intermediate strength product sulfuric acid, cooling the gas stream containing acid mist and moisture to temperature low enough to condense the bulk of the water vapor as weak sulfuric acid and to facilitate removal of acid mist from the gas stream, separating acid mist from the gas stream as liquid of $H_2SO_4$ strength substantially greater than that of said weak sulfuric acid, returning liquefied mist to said contacting zone, drying the gas stream, subjecting residual $SO_2$ to the action of an $SO_2$ oxidation catalyst, and recovering resulting $SO_3$, as high strength product sulfuric acid, by absorption in high strength sulfuric acid.

3. In the manufacture of sulfuric acid by the contact process, the steps comprising forming an $SO_2$-oxygen gas mixture heated to temperature high enough to initiate catalytic oxidation, subjecting the gas mixture to the action of an $SO_2$ oxidation catalyst under conditions to catalytically oxidize a substantial amount but not more than 40% of said $SO_2$ to $SO_3$, contacting the resulting gas stream in a gas-liquid contacting zone with sulfuric acid of $H_2SO_4$ strength not in excess of 80%, and in said zone, substantially by conversion of sensible heat of the gas to latent heat of vaporization of water, boiling water out of said acid and into the gas stream as water vapor, concentrating said acid, and cooling the gas stream to temperature in the range of 200–330° F., whereby there is formed a contacting zone exit gas stream containing $SO_2$, acid mist and water vapor, and a contacting zone liquid effluent comprising intermediate strength product sulfuric acid, rapidly cooling the gas stream containing acid mist and moisture to temperature of 75–110° F. to condense the bulk of the water vapor as weak sulfuric acid and to facilitate removal of acid mist from the gas stream, separating acid mist from the gas stream as liquid of $H_2SO_4$ strength substantially greater than that of said weak sulfuric acid, returning liquefied mist to said contacting zone, drying the gas stream, subjecting residual $SO_2$ to the action of an $SO_2$ oxidation catalyst, and recovering resulting $SO_3$, as high strength product sulfuric acid, by absorption in high strength sulfuric acid.

HENRY F. MERRIAM.

REFERENCES CITED

The following references are of record in the file of this patent:

UNITED STATES PATENTS

| Number | Name | Date |
| --- | --- | --- |
| 1,789,460 | Clark | Jan. 20, 1931 |
| 2,071,598 | Girsewald et al. | Feb. 23, 1937 |